United States Patent
Lauer et al.

(10) Patent No.: US 7,543,300 B2
(45) Date of Patent: Jun. 2, 2009

(54) INTERFACE FOR APPLICATION COMPONENTS

(75) Inventors: John Donald Lauer, Tucson, AZ (US); Yan Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/990,652

(22) Filed: Nov. 16, 2004

(65) Prior Publication Data

US 2006/0117321 A1 Jun. 1, 2006

(51) Int. Cl.
*G06F 13/00* (2006.01)

(52) U.S. Cl. ........................ 719/311; 719/330

(58) Field of Classification Search ............... 719/310, 719/311, 313, 330
See application file for complete search history.

(56) References Cited

U.S. PATENT DOCUMENTS

| | | | |
|---|---|---|---|
| 6,487,607 B1 | 11/2002 | Wollrath et al. | |
| 6,549,955 B2 | 4/2003 | Gutherie et al. | |
| 6,629,128 B1 | 9/2003 | Glass | |
| 6,704,768 B1 * | 3/2004 | Zombek et al. | 709/201 |
| 6,735,200 B1 | 5/2004 | Novaes | |
| 6,901,588 B1 * | 5/2005 | Krapf et al. | 717/164 |
| 2002/0032783 A1 * | 3/2002 | Tuatini | 709/229 |
| 2002/0114341 A1 | 8/2002 | Sutherland et al. | |
| 2003/0070006 A1 | 4/2003 | Nadler et al. | |
| 2003/0095504 A1 | 5/2003 | Ogier | |
| 2003/0115379 A1 | 6/2003 | Burton et al. | |
| 2003/0154238 A1 | 8/2003 | Murphy et al. | |
| 2003/0177170 A1 | 9/2003 | Glass | |
| 2003/0177205 A1 | 9/2003 | Liang et al. | |
| 2003/0179742 A1 | 9/2003 | Ogier et al. | |
| 2003/0182427 A1 | 9/2003 | Halpern | |
| 2003/0208640 A1 | 11/2003 | Just | |
| 2004/0010575 A1 | 1/2004 | Wookey et al. | |
| 2004/0103407 A1 | 5/2004 | Blaukopf et al. | |
| 2004/0122937 A1 * | 6/2004 | Huang et al. | 709/224 |
| 2004/0158780 A1 | 8/2004 | Conrad | |
| 2005/0021707 A1 * | 1/2005 | Fendt | 709/223 |

(Continued)

FOREIGN PATENT DOCUMENTS

EP 1135001 A2 9/2001

(Continued)

OTHER PUBLICATIONS

U.S. Patent Application entitled "Dynamic Generator for Fast-Client Static Proxy from Service Interface", U.S. Appl. No. 10/428,206, filed Apr. 30, 2003, by inventor Y. Yoon.

(Continued)

*Primary Examiner*—Andy Ho
(74) *Attorney, Agent, or Firm*—Rabindranath Dutta; Konrad Raynes & Victor LLP

(57) ABSTRACT

Provided are methods, wherein a first application and a second application are executed in a first process space in a node, wherein a third application is capable of executing in a second process space. A common interface to the first, the second, and the third applications are provided by a remote proxy class. The third application is executed in the first process space by securing a plurality of attributes for the third application from the common interface.

9 Claims, 8 Drawing Sheets

U.S. PATENT DOCUMENTS

2006/0146823 A1* 7/2006 Ding .................... 370/390

FOREIGN PATENT DOCUMENTS

WO          03053075          6/2003

OTHER PUBLICATIONS

U.S. Patent Application entitled "Reconfiguring a Network by Utilizing a Predetermined Length Quiescent State", U.S. Appl. No. 10/436,222, filed May 12, 2003, by inventors C.S. Chang, D.D. Jurgensen, O.T. Kirby, and F. Knop.

Great Britain patent application entitled "Data Processing Systems", Serial No. 0227872.2, filed Nov. 29, 2002, by inventors P.N. Cashman, C.F. Fuente, W.J. Scales.

U.S. Patent Application entitled "Node Discovery and Communications in a Network", Serial No. not yet assigned, filed Nov. 16, 2004, by inventors J.D. Lauer, R.K. Martinez, B.D. McCain, A.L. Therrien, and Y.Xu.

S. Floyd, et al., "The Synchronization of Periodic Routing Messages", IEEE/ACM Transactions on Networking, Apr. 1994, [online], pp. 1-28. [Retrieved on Nov. 16, 2004].

Letter regarding Art Cited in Counterpart Chinese Patent Application, dated Aug. 22, 2008, 1 p.

Patent Abstract for WO03053075, published on Jun. 26, 2003, 1 p.

* cited by examiner

INTERFACE FOR APPLICATION COMPONENTS

BACKGROUND

1. Field

The disclosure relates to a method, system, and article of manufacture for an interface for application components.

2. Background

A network may include a collection of nodes, such as, computing systems, storage servers, etc., that are in communication with each other over communication links. There are many types of network, including local area networks (LAN), wide area networks (WAN), intranet, Internet, Storage Area Networks (SAN), etc. A high-speed subnetwork of storage servers and storage devices may be included in a SAN, where the storage servers may provide or control access to data that may be stored in the storage devices. For example, IBM* TotalStorage* Enterprise Storage Servers* (ESS) may function as storage servers in a SAN environment.

* IBM, TotalStorage, and Enterprise Storage Server are trademarks or registered Trademarks of IBM Corporation.

In a network environment with a plurality of nodes, each node may have at least one component that manages interprocess communications for the node. The component may be referred to as a message router or an interprocess communications component.

An interprocess communications component may use remote procedure calls. Remote procedure calls allow programs on one node to call procedures located on other nodes. For example, when a process of a first node calls a procedure on a second node, the calling process on the first node may be suspended, and the execution of the called procedure may take place on the second node. Information can be sent from the caller process to the calle procedure via parameters, and information can be returned to the caller process via the procedure results.

Remote procedure calls are procedure or method based and a plurality of calls may be required to obtain a plurality of attributes. For example, if a class has attributes A, B, and C with corresponding methods getA(), getB(), and getC(), then three remote calls may be required to get the attributes A, B and C.

SUMMARY OF THE DESCRIBED EMBODIMENTS

Provided are a method, system and article of manufacture, wherein a first application and a second application are executed in a first process space in a node, wherein a third application is capable of executing in a second process space. A common interface to the first, the second, and the third applications are provided by a remote proxy class. The third application is executed in the first process space by securing a plurality of attributes for the third application from the common interface.

In certain embodiments, the node is included in a network that comprises a plurality of nodes, wherein the first application is an interprocess communications component, wherein the second and the third applications are included in a plurality of software components that execute on the node, and wherein the interprocess communications component allow the plurality of software components to communicate with other nodes of the network. In additional embodiments, the network is a storage area network, wherein the node is a first storage server implemented in the storage area network, wherein the interprocess communications component is a first message router, wherein the first storage server and a second storage server comprise a storage facility, and wherein the first message router on the first storage server and a second message router on the second storage server allow redundant storage of data spread across the first and the second storage servers.

In further embodiments, all attributes for the third application are extracted from the common interface by a single call to the common interface.

In still further embodiments, the first application is a message router, wherein the message router and the second application communicate via an implementation interface, wherein the third application and the message router communicate via a proxy interface, and wherein the implementation interface and the proxy interface are returned by class factories of a service interface class derived from the remote proxy class that provides the common interface.

In yet further embodiments, the third application calls a service interface class derived from the remote proxy class. Class factories of the service interface class determine a type of class that is to be returned to the third application. A service interface remote proxy class is returned to the third application, wherein the third application uses the service interface remote proxy class to communicate with the first application.

In additional embodiments, the second application calls a service interface class derived from the remote proxy class. Class factories of the service interface class determine a type of class to be returned to the third application. A service interface remote implementation class is returned to the second application, wherein the second application uses the service interface remote implementation class to communicate with the first application.

In further embodiments, the remote proxy class in a class implemented in an object oriented language, wherein the remote proxy class that provides the common interface allows the third application to communicate with the first application by a proxy interface provided via class factories of at least one class derived from the remote proxy class.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
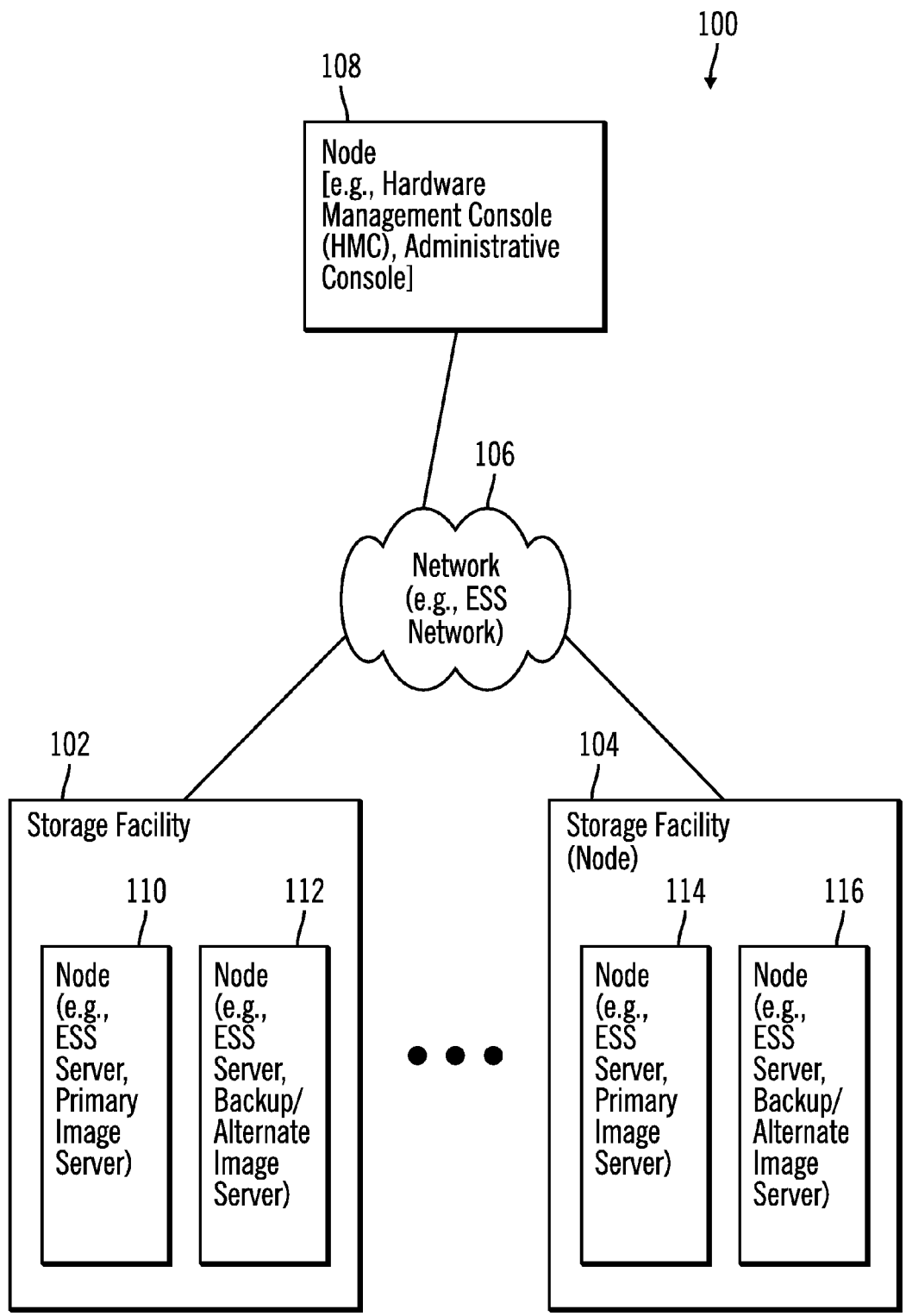
FIG. 1 illustrates a block diagram of a computing environment in accordance with certain embodiments.

FIG. 1 illustrates a block diagram of a computing environment 100 in accordance with certain embodiments. The computing environment 100 includes one or more storage facilities 102, 104 in communication over a network 106 to an administrative console 108.

The storage facilities 102, 104 may be comprised of two or more nodes. For example, the storage facility 102 may comprise a primary image server 110 and an alternate image server 112, and the storage facility 104 may comprise a primary image server 114 and an alternate image server 116. In certain embodiments, the alternate image servers 112 and 116 may store backup data of the primary image servers 110 and 114 respectively. In certain other embodiments, the nodes 110, 112, 114, 116 may be ESS servers.

In certain embodiments, the nodes 108, 110, 112, 114, 116 may comprise any suitable computational device, including those presently known in the art, such as, a storage server, a server, a personal computer, a workstation, a mainframe, a midrange computer, a network appliance, a palm top computer, a telephony device, a blade computer, a hand held computer, etc. The nodes 108, 110, 112, 114, 116 may be deployed in the computing environment 100 as nodes of the network 106, where the network 106 may include any suitable network, including those presently known in the art, such as, a SAN, a LAN, an Intranet, the Internet, an ESS network, etc.

Therefore, FIG. 1 illustrates certain embodiments in which a plurality of nodes 108, 110, 112, 114, 116 that may include storage servers are coupled over a network 106. The plurality of nodes 108, 110, 112, 114, 116 may include a plurality of application components and message routers that may allow message communications among the plurality of nodes 108, 110, 112, 114, 116 of the network 106.

Figure 2:
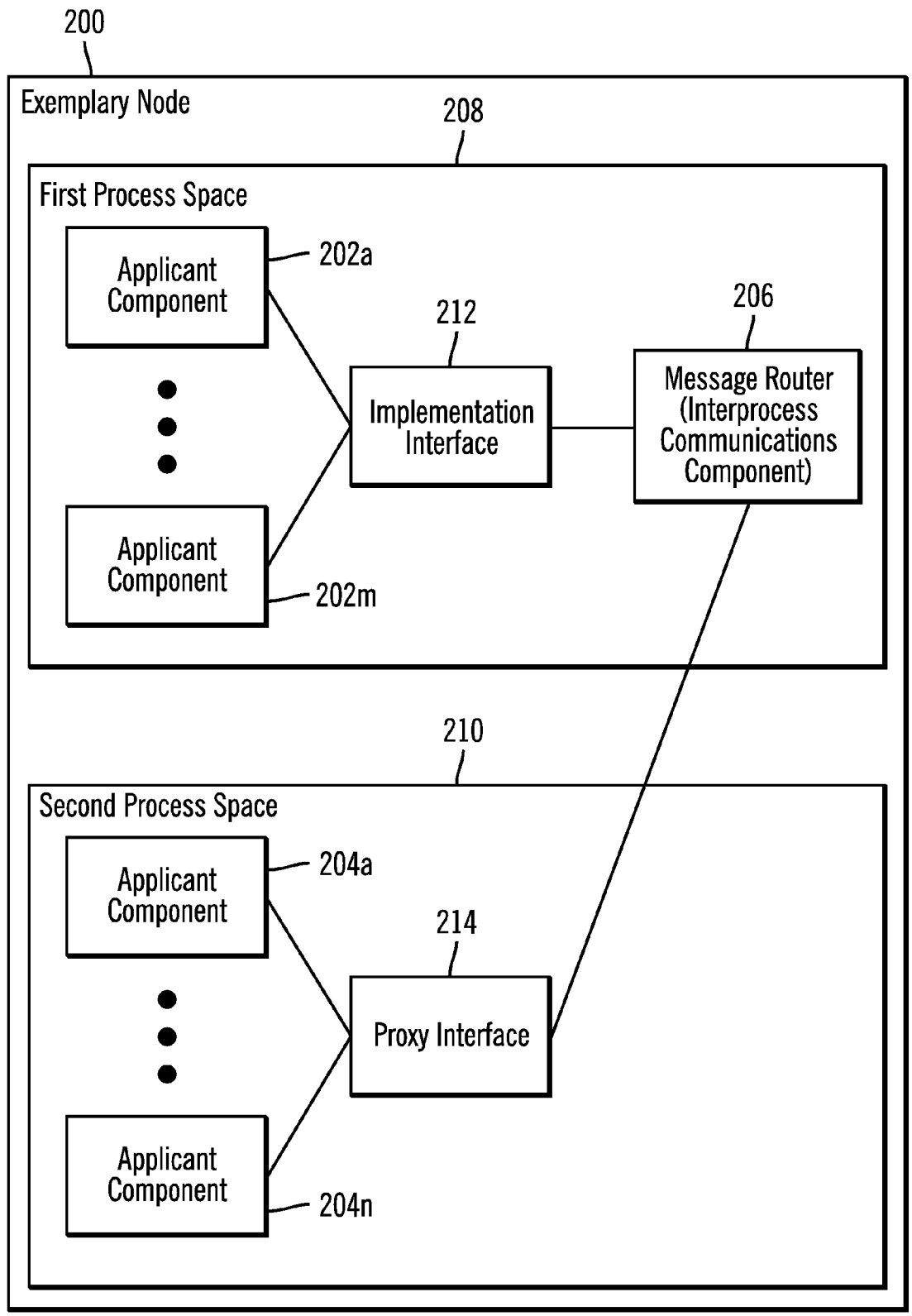
FIG. 2 illustrates a block diagram that shows application components and a message router included in an exemplary node of the computing environment, in accordance with certain embodiments.

FIG. 2 illustrates a block diagram that shows a plurality of application components and a message router included in an exemplary node 200 of the computing environment 100, in accordance with certain embodiments;

The exemplary node 200 may comprise any of the nodes 108, 110, 112, 114, 116 illustrated in FIG. 1. For example, in certain embodiments the exemplary node 200 may be the ESS server 110. The exemplary node 200 includes a plurality of application components 202a ... 202m, 204a ... 204n, and a message router 206.

In certain embodiments, the message router 206 is an interprocess communications component that is capable of sending and receiving messages over the network 106. The message router 206 may include applications implemented in software, hardware, firmware, or any combination thereof. In certain embodiments, the message router 206 may be a processor and memory intensive application in comparison to certain of the application components 202a ... 202m, 204a ... 204n because the message router 206 may be running at all times and may need to be always ready to send and receive messages over the network 106. In certain embodiments, the message router 206 may belong to a first process space 208, when the message router 206 is executing in the exemplary node 200. In certain operating systems, a process space may include a pool of process identifiers and the parent/child relationships that make up the process tree of the process space.

The application components 202a ... 202m, 204a ... 204n belong to two different sets. The first set of application components 202a ... 202m and the message router 206 may belong to the first process space 208, i.e., the application components 202a ... 202m and the message router 206 share the same process space 208. Since the first set of application components 202a ... 202m share the same process space as the message router 206, the first set of application components may be able to communicate with the message router 206 with less overhead in processing time and/or memory usage when compared to application components that do not share the same process space as the memory router 206.

The second set of application components 204a ... 204n may be capable of executing in a second process space 210. However, if application components 204a ... 204n execute in the second process space 210, then the processing overhead for communicating with the message router 206 may be higher for the application components 204a ... 204n when compared to the application components 202a ... 202m.

Certain embodiments provide a common interface for communications to the first set of application components 202a ... 202m and the second set of application components 204a ... 204n. An interface is a device or a system that unrelated entities may use to interact with each other. In object oriented programming systems, an interface is a device or programming language construct that may allow unrelated objects to interact with each other. An interface may declare methods that one or more classes are expected to implement. In certain embodiments, an interface may by able to reveal an object's programming interface without revealing the class of the object. The common interface may be provided in certain embodiments by a remote proxy class, implemented in an object-oriented programming language, such as, the Java* programming language.

\* Java is a trademark or a registered trademark of Sun Microsystems.

In certain embodiments the first set of application components 202a ... 202m interact with the message router 206 via an implementation interface 212 drawn from the remote proxy class. Additionally, the second set of application components 204a ... 204n interact with the message router 206 via a proxy interface 214 drawn from the remote proxy class.

The second set of application components 204a ... 204n are able to communicate with the message router 206 by using a lesser amount of resources, in comparison to communicating with the message router 206 without using the proxy interface 214. The resource that are saved may include processor time and/or the amount of memory.

Therefore, FIG. 2 illustrates certain embodiments in which a proxy interface 214 allows a set of application components 204a ... 204n to communicate with the message router 206, where the application components 204a ... 204n and the message router 206 may execute in different process spaces.

Figure 3:
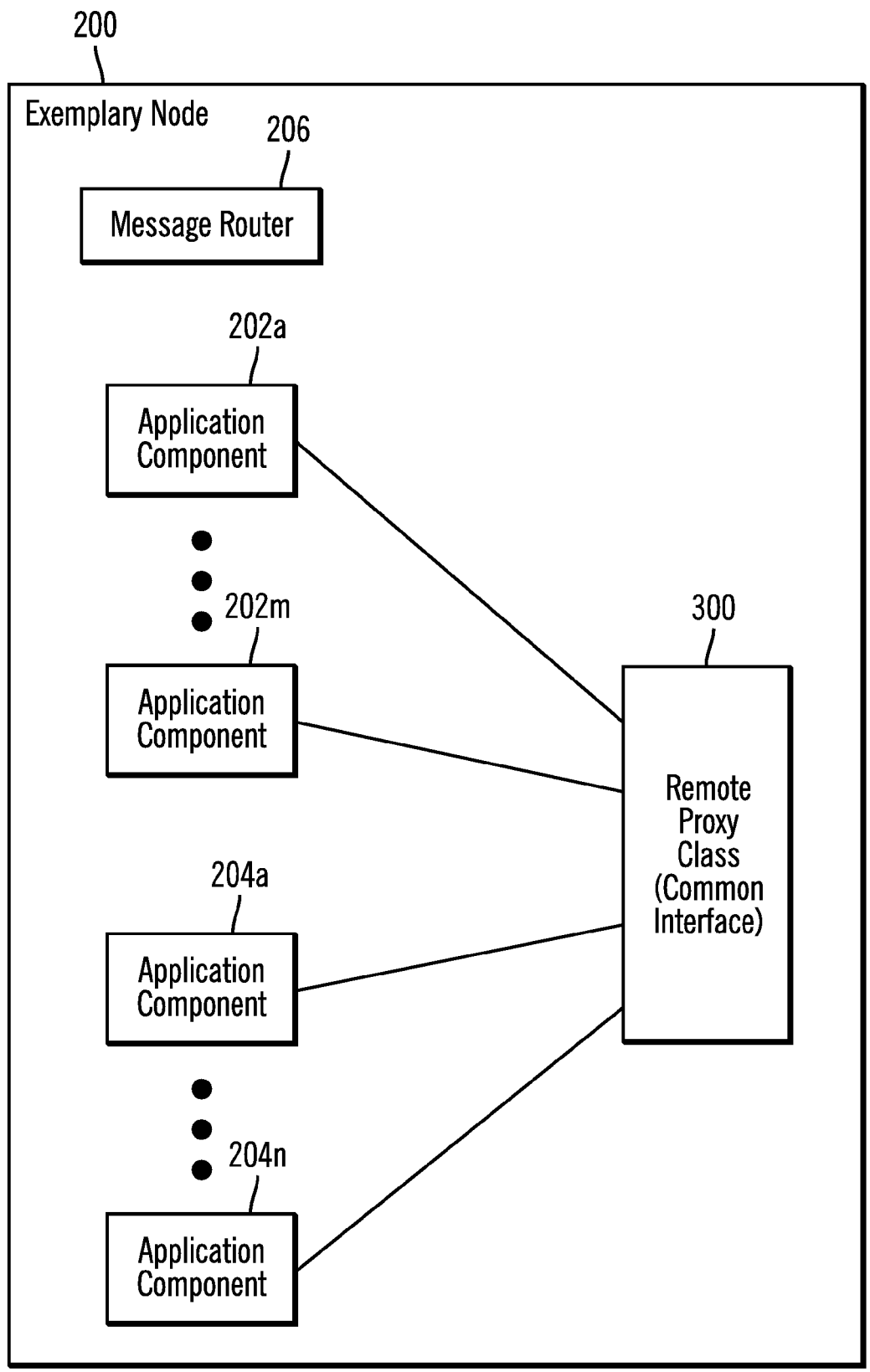
FIG. 3 illustrates a block diagram that shows a remote proxy class that is used by the application components and the message router, in accordance with certain embodiments.

FIG. 3 illustrates a block diagram that shows a "Remote Proxy" class 300 that is used by the two sets of application components 202a ... 202m and 204a ... 204n, and the message router 206, in accordance with certain embodiments.

The "Remote Proxy" class 300 provides a common interface to the two sets of applications 202a ... 202m, and 204a ... 204n. In certain embodiments, the "Remote Proxy" class 300 may be implemented in an objected oriented language, such as the Java programming language. Classes derived from the "Remote Proxy" class 300 are used by the application components 202a ... 202m, 204a ... 204n.

Figure 4:
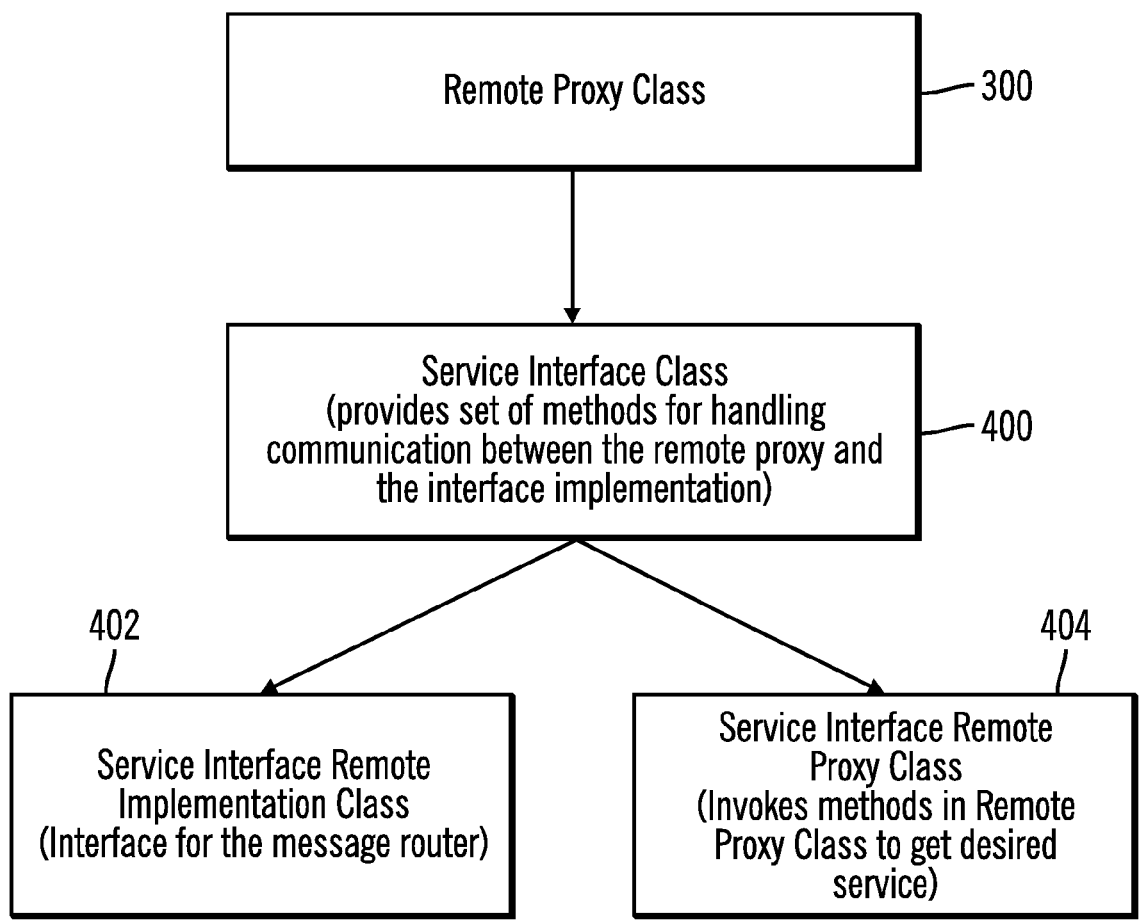
FIG. 4 illustrates a block diagram of a remote proxy class and a service interface class, wherein the service interface class uses class factories to return classes to application components, in accordance with certain embodiments.

FIG. 4 illustrates a block diagram of the "Remote Proxy" class 300 and a "Service Interface" class 400 that uses a class factory to return classes to application components 202a ... 202m, 204a ... 204n, in accordance with certain embodiments.

The interface for the message router 206 is defined in the abstract class referred to as a "Service Interface" class 400, where the "Service Interface" class 400 is derived from the "Remote Proxy" class 300. In different objected oriented languages the syntax for naming and identifying classes may be different. However, functions provide by the "Service Interface" class 400 and the "Remote Proxy" class 300 may be designed in any suitable object oriented programming language.

FIG. 4 shows a "Service Interface Remote Implementation" class 402 and a "Service Interface Remote Proxy" class 404 derived from the "Service Interface" class 400. In object oriented terminology, the "Service Interface Remote Implementation" class 402 is an implementation of the "Service Interface" methods, and the "Service Interface Remote Proxy" class 400 is a remote proxy interface of the "Service Interface" class 400.

The "Service Interface Remote Implementation" class 402 provides interfaces for the message router 206. The methods in the "Service Interface Remote Proxy" class 404 may invoke methods in the "Remote Proxy" class 300 to obtain desired services.

Therefore, FIG. 4 illustrates certain embodiments in which the "Remote Proxy" class 300 provides common interfaces for use by the application components 202a ... 202m, 204a ... 204n. In certain embodiments, applications may secure attributes stored in objects derived from the classes shown in FIG. 4.

Figure 5:
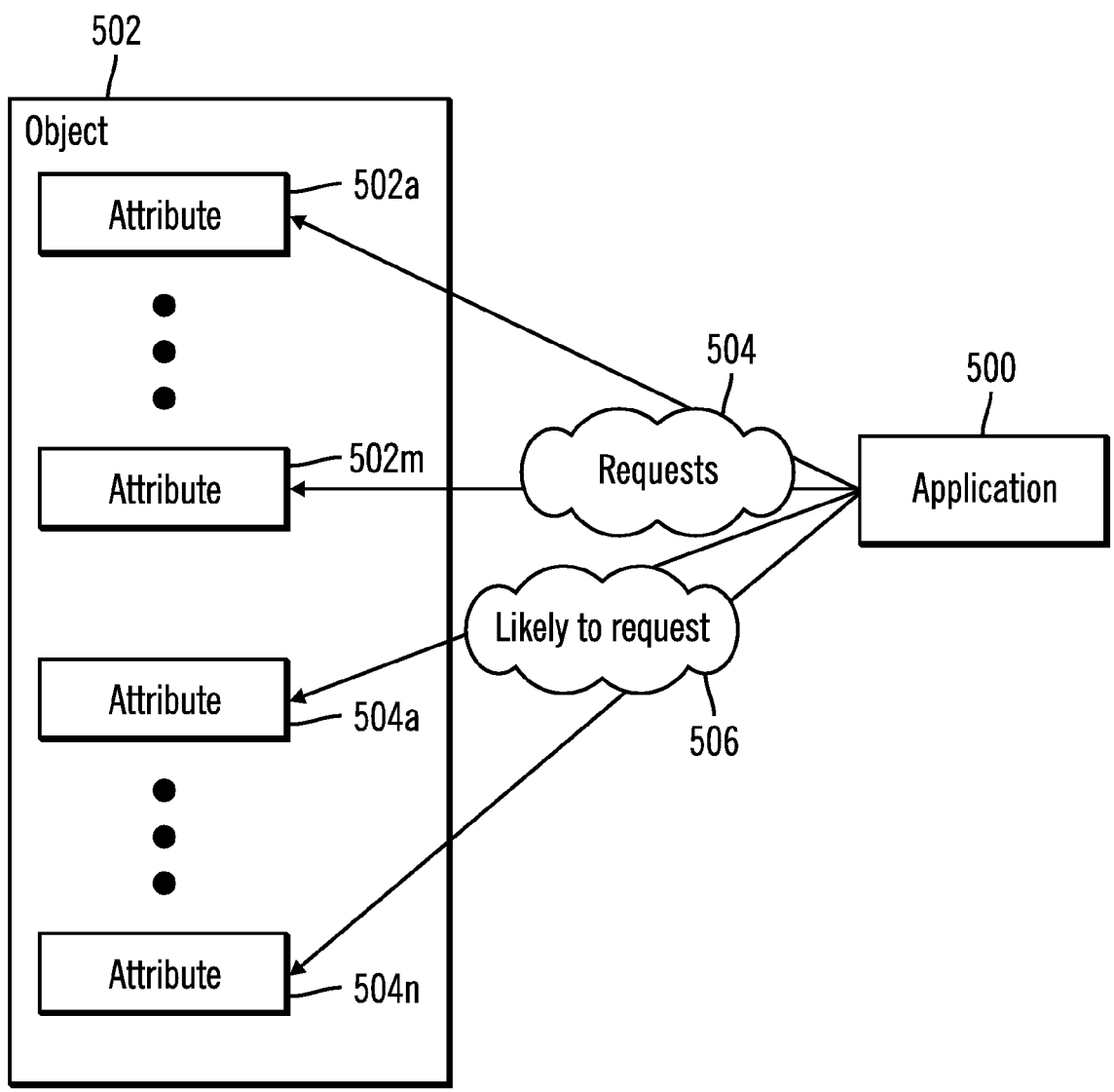
FIG. 5 illustrates a block diagram of an application that secures all attributes of an object via a single call, in accordance with certain embodiments.

FIG. 5 illustrates a block diagram of an application in the computing environment 100, where the application secures all attributes of an object via a single call, in accordance with certain embodiments. In certain embodiments, the object may be an instance of a class, such as, the class 300, 400, 402, or 404 shown in FIG. 4.

In certain embodiments, the application 500 may access attributes of the object 502, where the object 502 is an instance of any of the classes 300, 400, 402, 404 shown in FIG. 4. If the application 500 requests (reference numeral 504) the attributes 502a ... 502m of the object 502, then because of the principle of locality of reference, it is likely (reference numeral 506) that the application 500 would also request the attributes 504a ... 504n of the object 502 in the near future. In certain embodiments, the performance of the application 500 may improve if all attributes 502a ... 502m, 504a ... 504n are extracted via a single call from the application 500 to the object 502.

Therefore, FIG. 5 illustrates certain embodiments in which the application 500 implemented in the computing environment 100 extracts all attributes of an object 502 via a single call and reduces processing time requirements in comparison to situations where attributes are extracted in a plurality of groups. The object 502 may represent any object that is an instance of any of the classes 300, 400, 402, 404 that are provided in the computing environment 100. In certain embodiments, all attributes of an object are extracted while using the "Remote Proxy" class 300.

Figure 6:
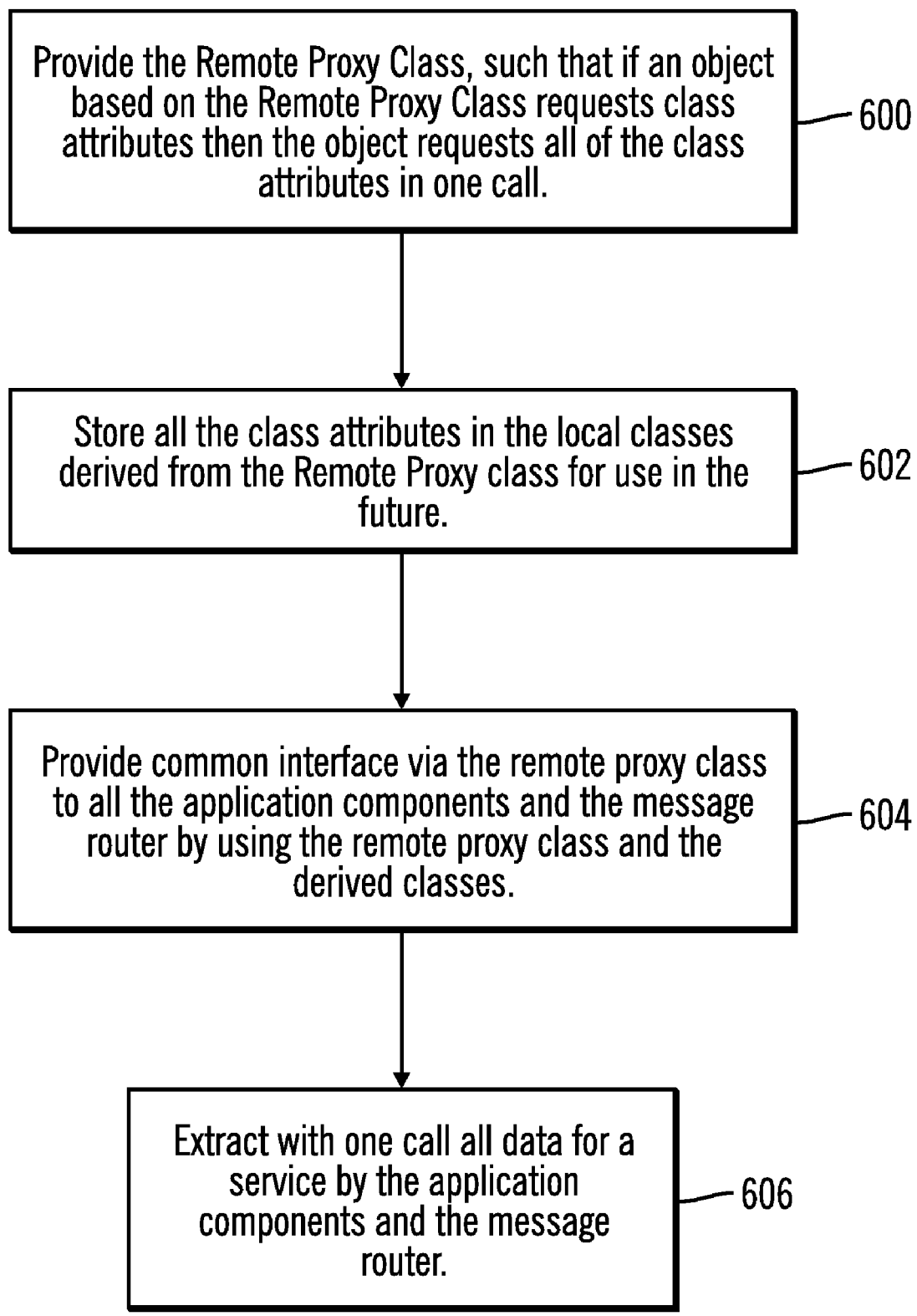
FIG. 6 illustrates operations for providing a common interface to the application components and the message router, in accordance with certain embodiments.

FIG. 6 illustrates operations for providing a common interface to application components 202a ... 202m, 204a ... 204n and the message router 206, in accordance with certain embodiments.

Control starts at block 600, where the "Remote Proxy" class 300 is provided by a program written in an object oriented programming language, such as, the Java programming language. In certain embodiments, if an object based directly or indirectly on the "Remote Proxy" class 300 requests class attributes then the object requests all of the class attributes in a single call. In certain alternative embodiments, all the class attributes may not be requested in a single call.

The class attributes are stored (at block 602) in the local classes derived from the "Remote Proxy" class 300 for use in the future. Common interfaces are provided (at block 604) via the "Remote Proxy" class 300 to all the application components 202a ... 202m, 204a ... 204n, and the message router 206. The common interfaces are provided by using the "Remote Proxy" class 300 and the derived classes 400, 402, 404 shown in FIG. 4.

The application components 202a ... 202m, 204a ... 204n and the message router 206 extract with a single call all data for a service by the application components 202a ... 204n, 204a ... 204n and the message router 206.

Therefore, FIG. 6 illustrates certain embodiments in which a "Remote Proxy" class 300, that provides a common interface, is provided to the application components 202a ... 202m, 204a ... 204n and the message router 206, where all data for a service provided by the application components 202a ... 202m, 204a ... 204n and the message router 206 are extracted in a single call, and where the data is stored in attributes of an object.

Figure 7:
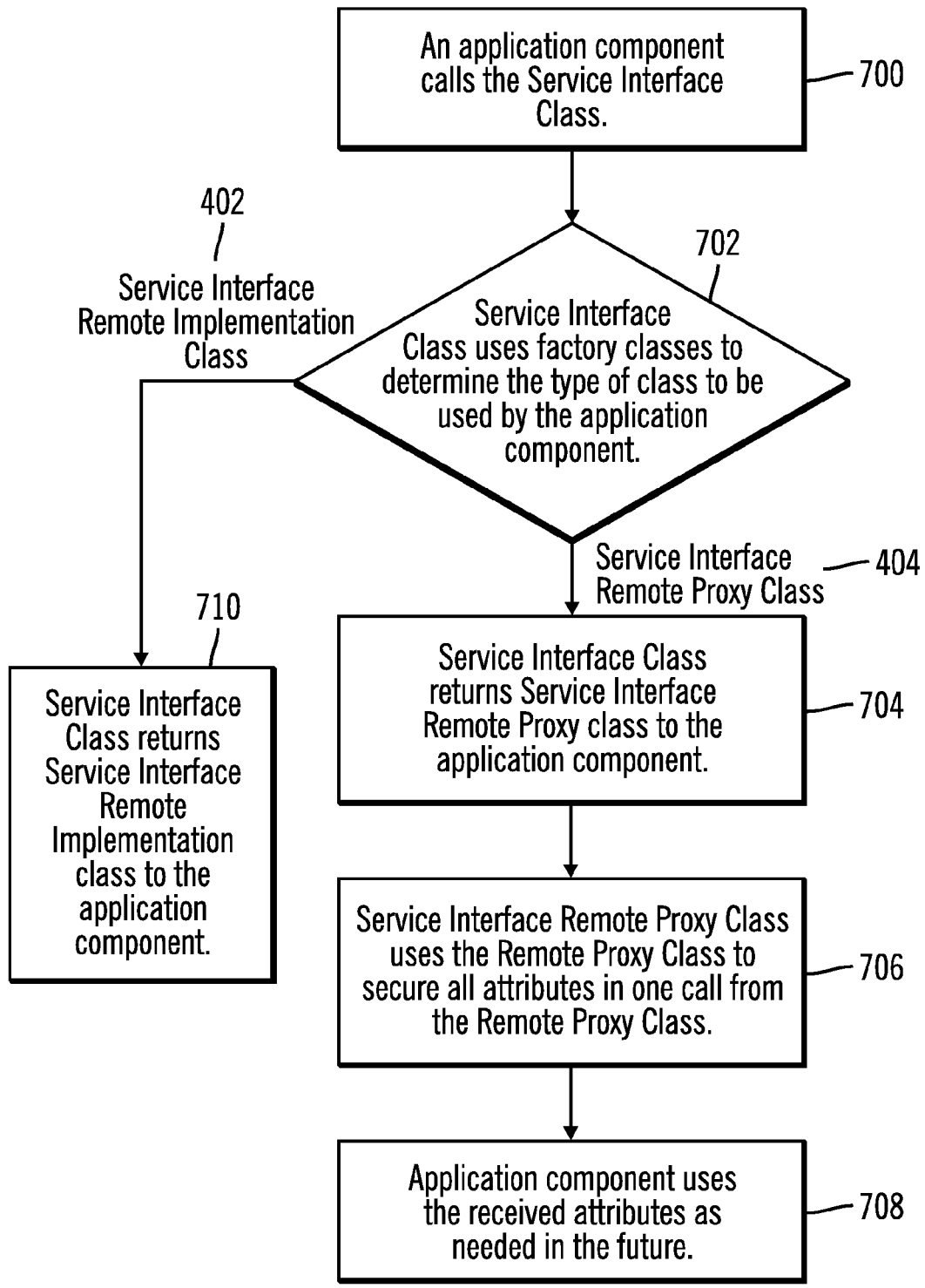
FIG. 7 illustrates operations for interfacing the applications components to the service interface class, in accordance with certain embodiments.

FIG. 7 illustrates operations for interfacing the application components 202a ... 202m, 204a ... 204n to the "Service Interface" class 400, in accordance with certain embodiments.

Control starts at block 700, where an exemplary application component, such as application component 204a calls the "Service Interface" class 400. In certain embodiments, the "Service Interface" class uses factory classes to determine the type of class to be used by the exemplary application component. Factory classes may be designed in an object oriented programming language, such as, the Java programming language.

If the "Service Interface" class 400 determines (at block 702) that the type of class to be used by the exemplary application component is the "Service Interface Remote Proxy" class 404, then the "Service Interface" class 400 returns (at block 704) the "Service Interface Remote Proxy" class 404 to the exemplary application is one of the application components 204a ... 204n cable of excuting in the second process space, the "Service Interface" class 400 uses factories to determine that the exemplary component needs the "Service Interface Remote Proxy" class 404 to provide the proxy interface 214 (shown in FIG. 2.) to allow the application components 204a ... 204n to communicate with the message router 206.

The "Service Interface Remote Proxy" class 404 uses (at block 706) the "Remote Proxy" Class 300 to secure all attributes in one call from the "Remote Proxy" class 300. The exemplary application components uses (at block 708) the received attributes as needed in the future.

If the "Service Interface" class 400 determines (at block 702) that the type of class to be used by the exemplary application component is the "Service Interface Remote Implementation" class 404, then the "Service Interface" class returns (at block 710) the "Service Interface Remote Implementation" class 404 to the exemplary application component. For example, in certain embodiments if the exemplary component is the message router 206 or any of the application components 202a ... 202m that are capable of executing in the same process space as the message router 206, then the "Service Interface" class 400 uses class factories to determine that the exemplary component needs the "Service Interface Remote Proxy" class 404 to provide the implementation interface 206 (shown in FIG. 2) to allow the application components 202a . . . 202m to communicate with the message router 206.

Therefore, FIG. 7 illustrates certain embodiments in which the "Service Interface" class 400 that is derived from the common interface provider "Remote Proxy" class 300, determines via class factories the type of class to be used by an exemplary component that calls the "Service Interface" class 400. If the exemplary component that calls the "Service Interface" class 400 is an application component 204a . . . 204n that is capable of executing in a process space different than the process space of the message router 206, then the "Service Interface" class provides the proxy interface 214 to establish communications between the exemplary component and the message router 206.

As a result of the use of class factories within the "Service Interface" class 400, the exemplary components do not have to make any determination as to what interface to use for communicating with the message router 206. Therefore, when a new application component is added to any of the nodes 108, 110, 112, 114, 116, 200 no additional modifications are required to the new application. The "Remote Proxy" 300 provides a common interface used by the new application to automatically communicate either via the proxy interface 214 or the implementation interface 212.

Certain embodiments reduce communications overhead and increase overall performance in the computing environment 100. In certain embodiments, data is aggregated by application components by extracting all attributes in a single call to an object.

In certain embodiments, methods that require class attributes may request all the class attributes, and then store the class attributes in the local class for use in the future.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 8:
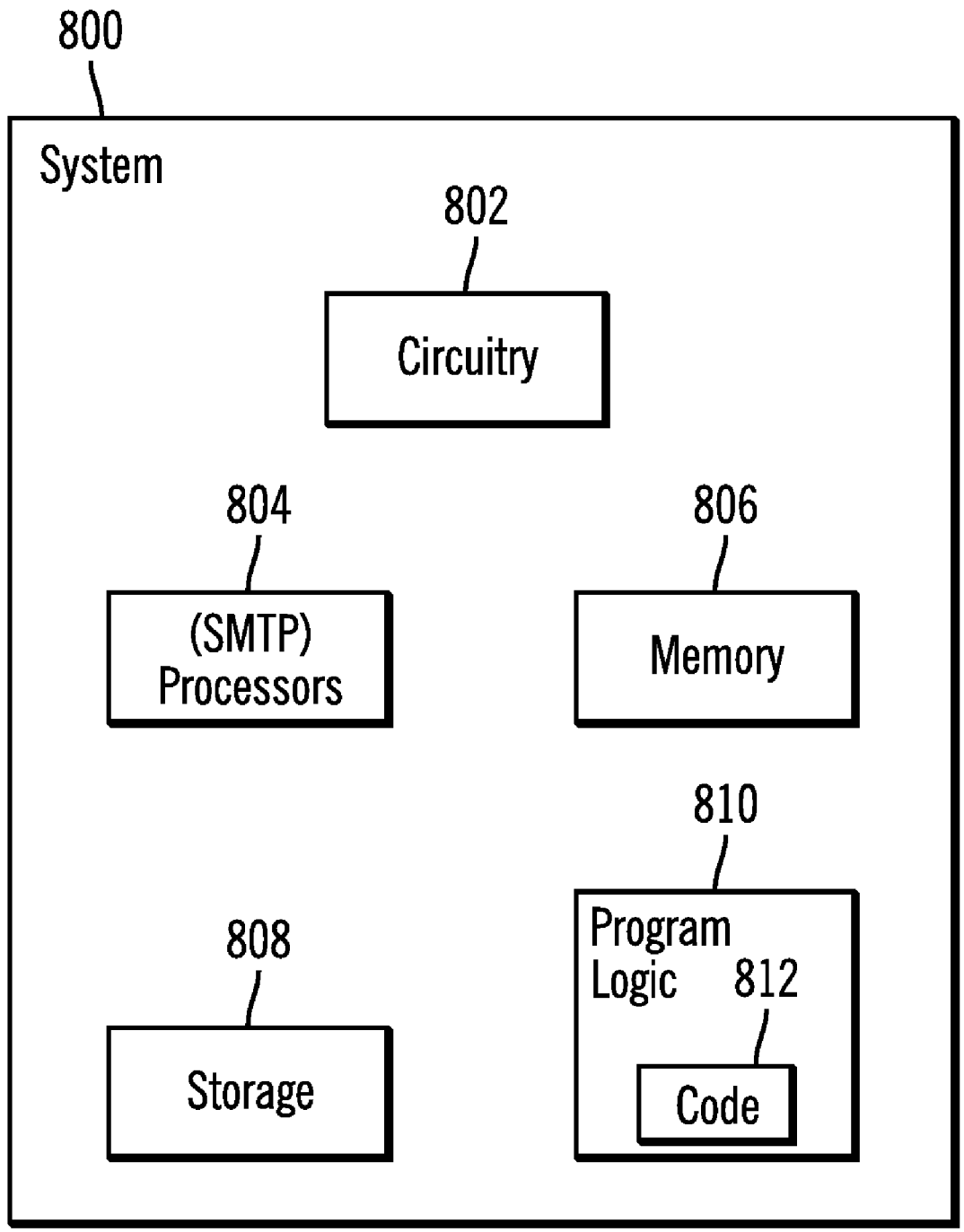
FIG. 8 illustrates a system in which certain embodiments are implemented.

FIG. 8 illustrates a block diagram of a system 800 in which certain embodiments may be implemented. In certain embodiments, the nodes 108, 110, 112, 114, 116, 200, may be implemented in accordance with the system 800. The system 800 may include a circuitry 802 that may in certain embodiments include a processor 804. The system 800 may also include a memory 806 (e.g., a volatile memory device), and storage 808. Certain elements of the system 800 may or may not be found in some or all of the nodes 108, 110, 112, 114, 116, 200. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 6-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

executing a first application and a second application in a first process space in a node, wherein a third application is capable of executing in a second process space;

providing, by a remote proxy class, a common interface to the first, the second, and the third applications; and executing the third application in the first process space by securing a plurality of attributes for the third application from the common interface, wherein the remote proxy class that provides the common interface is a class implemented in an object oriented language, wherein the remote proxy class that provides the common interface allows the third application to communicate with the first application by a proxy interface provided via class factories of at least one class derived from the remote proxy class, wherein:
  (i) in response to calling by the second application a service interface class derived from the remote proxy class, performing operations comprising:
    (a) determining via class factories of the service interface class which type of class is to be returned to the second application; and
    (b) returning a service interface remote implementation class to the second application, wherein the second application uses the service interface remote implementation class to communicate with the first application; and
  (ii) in response to calling by the third application the service interface class derived from the remote proxy class, performing operations comprising:
    (a) determining via the class factories of the service interface class which type of class is to be returned to the third application; and
    (b) returning a service interface remote proxy class to the third application, wherein the third application uses the service interface remote proxy class to communicate with the first application.

2. The method of claim 1, wherein the node is included in a network that comprises a plurality of nodes, wherein the first application is an interprocess communications component, wherein the second and the third applications are included in a plurality of software components that execute on the node, and wherein the interprocess communications component allow the plurality of software components to communicate with other nodes of the network.

3. The method of claim 2, wherein the network is a storage area network, wherein the node is a first storage server implemented in the storage area network, wherein the interprocess communications component is a first message router, wherein the first storage server and a second storage server comprise a storage facility, wherein the first message router on the first storage server and a second message router on the second storage server allow redundant storage of data spread across the first and the second storage servers.

4. The method of claim 1, wherein all attributes for the third application are extracted from the common interface by a single call to the common interface.

5. The method of claim 1, wherein the first application is a message router, wherein the message router and the second application communicate via an implementation interface, wherein the third application and the message router communicate via a proxy interface, and wherein the implementation interface and the proxy interface are returned by class factories of a service interface class derived from the remote proxy class that provides the common interface.

6. A method for deploying computing infrastructure, comprising integrating computer-readable code into a computing system, wherein the code in combination with the computing system is capable of performing:
  executing a first application and a second application in a first process space in a node, wherein a third application is capable of executing in a second process space;
  providing, by a remote proxy class, a common interface to the first, the second, and the third applications; and
  executing the third application in the first process space by securing a plurality of attributes for the third application from the common interface, wherein the remote proxy class that provides the common interface is a class implemented in an object oriented language, wherein the remote proxy class that provides the common interface allows the third application to communicate with the first application by a proxy interface provided via class factories of at least one class derived from the remote proxy class, wherein:
    (i) in response to calling by the second application a service interface class derived from the remote proxy class, performing operations comprising:
      (a) determining via class factories of the service interface class which type of class is to be returned to the second application; and
      (b) returning a service interface remote implementation class to the second application, wherein the second application uses the service interface remote implementation class to communicate with the first application; and
    (ii) in response to calling by the third application the service interface class derived from the remote proxy class, performing operations comprising:
      (a) determining via the class factories of the service interface class which type of class is to be returned to the third application; and
      (b) returning a service interface remote proxy class to the third application, wherein the third application uses the service interface remote proxy class to communicate with the first application.

7. The method of claim 6, wherein the node is included in a network that comprises a plurality of nodes, wherein the first application is an interprocess communications component, wherein the second and the third applications are included in a plurality of software components that execute on the node, and wherein the interprocess communications component allow the plurality of software components to communicate with other nodes of the network.

8. The method of claim 7, wherein the network is a storage area network, wherein the node is a first storage server implemented in the storage area network, wherein the interprocess communications component is a first message router, wherein the first storage server and a second storage server comprise a storage facility, wherein the first message router on the first storage server and a second message router on the second storage server allow redundant storage of data spread across the first and the second storage servers.

9. The method of claim 6, wherein all attributes for the third application are extracted from the common interface by a single call to the common interface.

* * * * *